Figure 1:
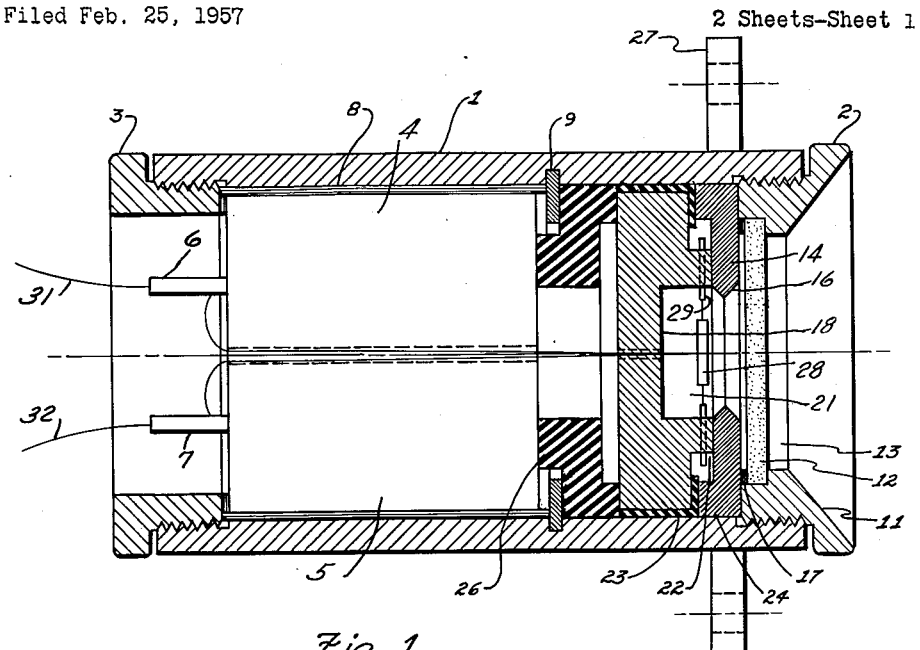

May 15, 1962 — C. P. BUTLER — 3,034,355
RADIATION CALORIMETER
Filed Feb. 25, 1957 — 2 Sheets-Sheet 1

INVENTOR.
Clay P. Butler
BY
George Sipkin

May 15, 1962 C. P. BUTLER 3,034,355
RADIATION CALORIMETER

Filed Feb. 25, 1957 2 Sheets-Sheet 2

INVENTOR.
Clay P. Butler
BY George Sipkin
Attorney

United States Patent Office 3,034,355
Patented May 15, 1962

3,034,355
RADIATION CALORIMETER
Clay P. Butler, San Mateo, Calif., assignor to the United States of America as represented by the Secretary of the Navy
Filed Feb. 25, 1957, Ser. No. 642,322
6 Claims. (Cl. 73—355)
(Granted under Title 35, U.S. Code (1952), sec. 266)

The invention described herein may be manufactured and used by or for the Government of the United States of America for governmental purposes without the payment of any royalties thereon or therefor.

This invention relates to the measurement of heat and, more particularly, to a calorimeter for measuring high level radiant energy in the order of 100 cal./sq. cm./sec.

Presently employed calorimeters of the type here considered have been concerned mostly with relatively low level energy and, for this reason, they have been able to use thin receiver buttons which allow fast response rates and high decay rates. However, such instruments are not feasible for present purposes because, if subjected to the presently contemplated intensities, their thin receivers would be destroyed. Even at the lower levels for which they are used, an attenuator, such as a glass filter, usually is positioned before the receiver to absorb a large portion of the thermal energy. This attenuator in turn, imposes difficulties since the ratio of the radiation intercepted by the attenuator to that absorbed by the receiver then must be calculated or suitably measured. Such a relationship sometimes has been found difficult to determine with any acceptable degree of accuracy.

Apparently, little development has been made in the measurement of short, intense pulses of radiant energy in the visible ultraviolet and infra-red portion of the spectrum, and quite clearly, the commercial field is devoid of any small, rugged, portable instrument which will measure radiant energy pulses up to 100 calories per square centimeter with peak irradiances up to 200 calories per square centimeter per second. The earlier work with thin receiver buttons substantially contacting massive heat sinks is little help since the response and decay constant there utilized would be totally unobtainable with receivers capable of withstanding the greatly increased intensity now contemplated.

It is therefore a general object of the invention to provide a radiation calorimeter which will directly and without appreciable attenuation measure radiations of short intense pulses of high energy level. A related object is the provision of such a calorimeter which has simple, portable and rugged interchangeable parts, and which also has substantially a 90 degree field of vision.

A further object of the invention is to provide a calorimeter receiving button which has a high response rate, a slow decay factor, which is non-selective spectrally, and which does not require an attenuating filter at radiation intensity level approximating 100 cal./sq. cm./sec.

According to the invention, intense radiant energy impinges upon a receiving button having a high response rate and a relatively slow decay factor. A "hot" thermocouple junction is conveniently connected to the back of the receiving button and the "cold" junction is connected to a junction block substantially insulated, electrically and thermally, from the receiving button. Most suitably, leads attached to the connector posts extend from the cold junction to an electrical recorder. A blackened heat sink is positioned behind the receiver button and the button preferably is suspended within the sink by thin wires or needles capable of minimizing heat loss. Fabrication of the calorimeter requires consideration of certain thermal principles and properties. When a receiving button is thin and has its edges in contact with a massive heat sink, it will have a high response rate, a short time constant, and fast decay rate. By suspendably positioning the receiver so that it has no substantial contact with a heat sink and also by increasing the thickness of the receiver, an instrument is obtained which is capable of measuring intense radiant energy without attenuation and with a slow decay constant. Such a thick, suspended receiver or calorimeter button may have a short time constant on its rise in temperature (about .002 sec./pulse) and a slow decay, the result being that differentiating the time-voltage curve provides an accurate intensity-time curve readable directly in calories/sq. cm./sec.

As would be expected, such measurements must contemplate the thickness of the receiver, although this thickness simply introduces a differential time constant which has been found to be a valid manner of determining the rate of delivery of energy. Such a differential time constant is the time in which the back or unexposed surface of the receiver button requires to reach 63% of its final value and, as stated, such a constant should be no more than 20 milliseconds. Other design factors which will be considered later are the area, the thermal diffusivity or conductivity, the change of the temperature of the receiver, and the thickness of the button.

Figure 2:
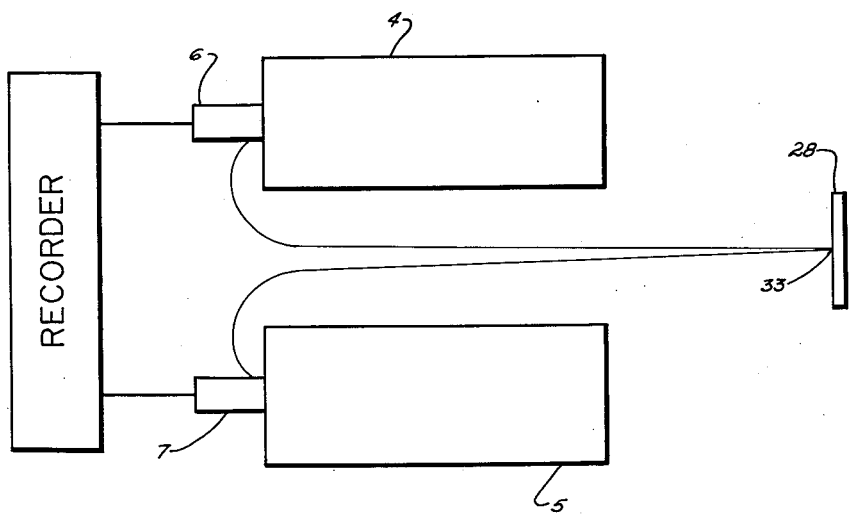

The invention is illustrated in the accompanying drawings of which FIG. 1 is a longitudinal section of one embodiment of the invention; FIG. 2 a block diagram of the electrical circuit of the FIG. 1 embodiment, and FIG. 3 a view similar to FIG. 1 of another embodiment.

Referring to FIG. 1, the instrument there shown includes a hollow cylindrical housing 1 which may be formed of metal or any other suitably rigid material, the housing having each of its end portions interiorly threaded to receive threaded end caps 2 and 3. End cap 3 serves the functional purpose of securing in position a pair of cold junction blocks 4 and 5 which mount connector posts 6 and 7, cap 3 bearing against an insulating ring formed of Micarta or other equivalent material which, in turn, bears against the blocks. Surrounding the blocks is another insulator in the form of a Micarta sleeve 8 which, at its forward end, abuts a steel snap ring 9 mounted, in the manner illustrated, in a groove provided in the bore of the housing.

The remaining members forming the instrument are held in position between snap ring 9 and forward cap 2 which, for reasons which will become apparent, can be considered as an outer aperture member. Proceeding from the forward end rearwardly, outer aperture member 2 has a beveled face 11 and a counter-sunk groove 12 into which is fitted a glass cover plate 13. Rearwardly of plate 13 is an inner aperture member 14 also provided with a beveled face 16, this member being held in a spaced-apart disposition from protective covering 13 by a seating ring 17. Rearwardly of and bearing against inner aperture member 14 is a heat sink member 18 adapted in a manner to be explained to absorb radiant energy and, as seen, the sink has a cylindrical counter-sunk recess or cavity 21 formed in its forward face. Also, projecting forwardly about the periphery of the sink is an integral circular flange 22, the outer face of which bears against the inner aperture member. Heat sink 18 is insulated from housing 1 by a heavy asbestos paper 23 which lies between the sink and a rearwardly projecting flange 24 integrally formed on the interior aperture member. A Micarta insulating block 26 spaces cold junction blocks 4 and 5 from heat sink 18 and this insulating block is specially formed with suitable flanges for this purpose. In particular, snap ring 9 bears against the insulating block which, in turn, has minimum contact with heat sink 18 and also is provided centrally with an open bore. The instrument as a whole also mounts radially-extending flange members 27 by means of which it can be supported in any desired fixed position.

One important feature of the invention is the inclusion of the cold junction blocks in a relatively small container so as to provide an easily portable unit, although this will be discussed more fully later. Another notable feature of the invention is the particular receiver or calorimeter button utilized and the manner in which this button is supported. Thus, as seen, receiver button 28 is suspendably mounted within cavity 21 of the heat sink 10 by means of thin wires or needles 29 which may be formed of steel or other appropriate metal and which have thickened sleeve members carried by flange 22 of the heat sink. A thermocouple is provided in somewhat of a conventional manner by the employment of two wires 31 and 32, these wires being of dissimilar metals, such as constantan and copper, and the wires having their hot junction 33 on the rear face of button 28. The cold junction for the wires is provided on connector posts 6 and 7 and suitable leads carry the voltage generated by the temperature differential to a measuring and recording device (not shown) which may be a commercially obtainable recorder such as a Heiland oscillographic recorder.

As has been indicated, receiver button 28 is substantially thicker than the receiver buttons used in prior calorimeters and, in any event, it is of sufficient thickness to withstand radiant energy intensities of around 100 cal./sq. cm./sec. with peak intensities up to 200 cal./sq. cm./sec. In practice, a thickness range of between 0.02–0.25 in. has been found suitable when receiver buttons are formed of such conventional material as copper or silver. Of course, any material used for this receiver button should have a high diffusivity which can be defined as the thermal conductivity divided by the product of the density and the specific heat. Also, the forwardly or outwardly facing surface must be coated so as to render it a "black body" and such coatings normally are provided by carbon, platinum or some other similar material.

At this point it may also be noted that the exposed faces of heat sink 18 also are coated in a like manner to render them "black." When a coated button of a thickness such as that just indicated is used, it is found that by proper choice of material such as will provide suitable thermal diffusivity, and by apportioning the area and thickness according to anticipated temperature rises, a button is provided which will have an acceptably high response rate or, in other words, an acceptably short time constant on its rise in temperature and, at the same time, such a button has the desirably property of a slow decay rate. In design considerations, the properties referred to should be chosen so as to provide a response rate of about .002 sec./pulse, while the decay rate should be in the order of 1 to 5 seconds. With such parameters, a button arranged in the manner previously described is capable of producing a time-voltage curve which, upon differentiation, provides an accurate reading of intensity in cals./sq. cm./sec.

Another factor which should be noted due to its effect upon the decay rate is the suspended support of the button on needles 29. Prior calorimeters utilizing thin receivers usually permitted a fast decay rate. The present button, being mounted on the needle points and being suspended in the space provided by cavity 21 of heat sink 18 loses little heat by convection or conduction and consequently its decay rate is minimized.

Another important factor is the fact that the button and the heat sink are effectively insulated from the cold junction of the thermocouple, or, in other words, the cold junction is, for all practical purposes, thermally isolated so as to assure readings which vary exclusively in accordance with temperature changes of the button rather than with heat which might be absorbed in the heat sink or in other parts. Hence, a constant temperature level is substantially maintained which provides a fiducial reference point for the voltage generating thermocouple. As will be appreciated, asbestos paper 23, insulator block 26, insulator sleeve 8 and other insulating elements all cooperate in producing the essential isolation. Also, the cold junction blocks are relatively large so as to dissipate any stored heat which might affect the temperature differential to the extent of providing an inaccurate reading.

Figure 3:
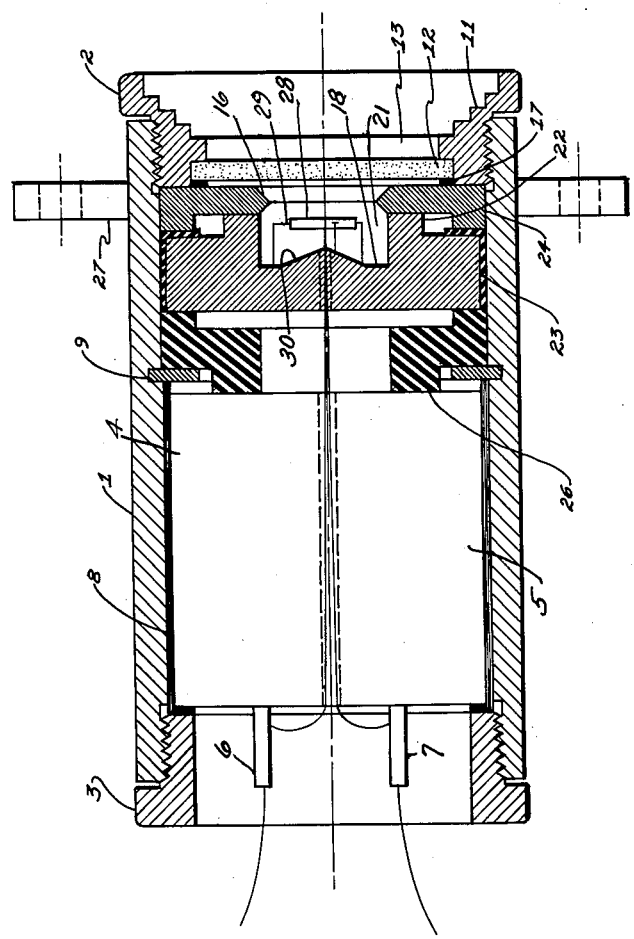

The embodiment of the invention illustrated in FIG. 3 is quite similar to that already described with respect to FIG. 1. The major differences include first the fact that face 11 of outer aperture 2 is stepped instead of beveled, and next the fact that button 33 is mounted on wires projecting axially out of a cone-shaped projection 30 formed on the base of recess 21 of heat sink 18. It is found that both of these variations are in some situations beneficial in avoiding undesirable reflections of radiation from the heat sink to the rear of the receiver button. In the FIG. 1 modification, beveled face 11 is tapered at such an angle as to focus all of the radial energy into the button, and, similarly beveled face 16 of the inner aperture member also is provided with such a taper. The stepped outer face of the FIG. 2 modification accepts the same amount of light but at the same time reflects away such light as otherwise might find its way past the receiver button so as to impinge directly upon the heat sink where it might be reflected to the rear of the button. Cone 30 of the heat sink also is tapered as a precautionary measure so that any radiations impinging directly upon it are reflected back to other areas of the heat sink rather than to the rear of the button. The mounting of the button on the axially extending wires of the FIG. 2 modification is functionally identical to the radial needle mounting of FIG. 1 modification.

It is believed that the operation of the instrument is rather obvious. Radiant energy striking the button reacts on the thermocouple to initiate a voltage which, upon differentiation by the recorder, reads directly in calories/sq. cm./sec. The short time constant of the button which, as previously explained, is a differential constant, along with the slow decay achieved by the button thickness, permit accurate reading of short, intense pulses of radiant energy as high as 100 cal./sq. cm./sec. Also, it is to be especially appreciated that the button does not require protection by any attenuating filter such as was the case with previous thin, button calorimeters. Instead, the button is directly exposed to radiant energy in that the only element between it and the energy is protective cover 13 which is formed of glass that should not have any appreciable attenuating effect. A further notable feature of the invention is the compactness and small size of the unit which is permitted by the convenient arrangement of elements as well as mounting the cold junction blocks in their isolated disposition within the housing.

Obviously many modifications and variations of the present invention are possible in the light of the above teachings. It is therefore to be understood that within the scope of the appended claims the invention may be practiced otherwise than as specifically described.

I claim:

1. Apparatus for measuring radiant energy pulse of a magnitude of 100 calories per square centimeter, said apparatus comprising a casing provided at its forward end with a wide aperture, a heat sink formed of heat-absorbing material and with a deep recess, said heat sink being disposed in said forward end of the casing with its recess facing said casing aperture, an energy-receiving button mounted in said heat sink recess and having one of its faces directly exposed to the energy level at said casing aperture, relatively non-heat-conductive wire-like members carried by said heat sink for supporting said button in a spaced disposition within said recess, and thermocouple means having a hot junction at the unexposed face of said button and a thermally-isolated cold junction disposed within said casing, said button having a sufficient thickness between its faces for withstanding said energy magnitude of 100 calories per square centimeter (said thickness being dependent on the material used and being within a range of 0.02–0.25 inch) said button also being formed of a highly diffusive material and having an energy response rate about .002 second per pulse, and said button thickness in conjunction with said non-conductive thin mounting members providing a relatively slow decay rate in the order of one to five seconds.

2. The apparatus of claim 1 wherein said button is formed essentially of copper.

3. The apparatus of claim 1 wherein said button is formed essentially of silver.

4. The apparatus of claim 1 wherein said button-supporting members are formed as rigid needles having thickened shank portions carried by the heat sink and relatively thin pointed portions engaging and supporting said button in its spaced disposition within said heat sink.

5. The apparatus of claim 1 wherein said aperture is stepped for minimizing radiation reflections from the heat sink recess to the receiver button.

6. The apparatus of claim 5 wherein said heat sink recess is specially formed for minimizing radiation reflections to the receiver button.

References Cited in the file of this patent

UNITED STATES PATENTS

| | | |
|---|---|---|
| 1,788,849 | Schunemann | Jan. 13, 1931 |
| 2,562,538 | Dyer | July 31, 1951 |
| 2,601,508 | Fastie | June 24, 1952 |
| 2,635,468 | Field et al. | Apr. 21, 1953 |
| 2,707,881 | Gier et al. | May 10, 1955 |
| 2,768,527 | Stern et al. | Oct. 30, 1956 |
| 2,785,860 | Harrison et al. | Mar. 19, 1957 |
| 2,921,972 | Kriesler et al. | Jan. 19, 1960 |